United States Patent [19]

Takahashi et al.

[11] Patent Number: 5,668,905
[45] Date of Patent: Sep. 16, 1997

[54] OPTICAL FIBER FERRULE ASSEMBLY HAVING ANGULAR INDEX SHOWING POLARIZATION PLANE

[75] Inventors: Mitsuo Takahashi; Kunio Yamada, both of Matsudo; Shuichi Takashi; Naotoshi Shiokawa, both of Kamagaya, all of Japan

[73] Assignee: Seikoh Giken Co., Ltd., Chiba-ken, Japan

[21] Appl. No.: 633,039

[22] Filed: Apr. 16, 1996

[30] Foreign Application Priority Data

Sep. 14, 1995 [JP] Japan .................................. 7-262373

[51] Int. Cl.$^6$ .......................................................... G02B 6/36
[52] U.S. Cl. ............................................................ 385/78
[58] Field of Search ........................... 385/51–78, 147; 250/227.11, 233

[56] References Cited

U.S. PATENT DOCUMENTS 4,848,867  7/1989  Kajioka et al. .................... 385/73 X
4,953,941  9/1990  Takahashi .............................. 385/72
5,216,733  6/1993  Nagase et al. ..................... 385/78 X
5,293,438  3/1994  Konno et al. ...................... 385/61 X Primary Examiner—Akm E. Ullah
Attorney, Agent, or Firm—Spencer & Frank

[57] ABSTRACT

An optical fiber ferrule assembly is equipped with an angular index for indicating a polarization plane of an optical fiber. The assembly includes a polarization plane maintaining optical fiber, an optical fiber ferrule for accommodating the optical fiber so that the optical fiber is fixed thereto in a state that a tip end surface of the optical fiber is exposed, and an angular index member. The angular index member is rotatable with respect to the ferrule. The optical fiber is fixed to the optical fiber ferrule and the angular index member and the optical fiber ferrule are temporarily assembled. Then the tip end surface of the optical fiber is enlarged for observation to decide the polarization plane thereof on the basis of its configuration, and the angular index member and the optical fiber ferrule are relatively rotated. They are then fixed to each other so that the angular index makes a predetermined angle relative to the polarization plane.

4 Claims, 5 Drawing Sheets

FIG. 8(A)
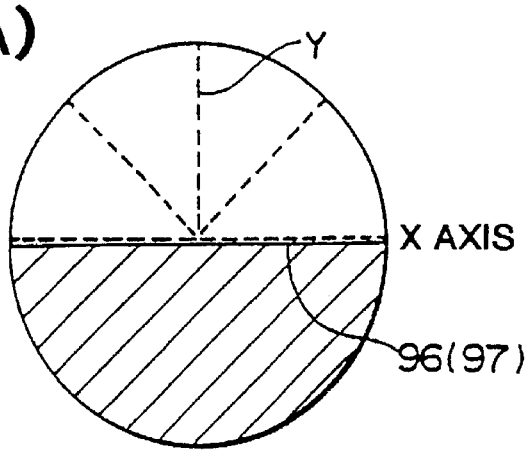
FIG. 8(B)
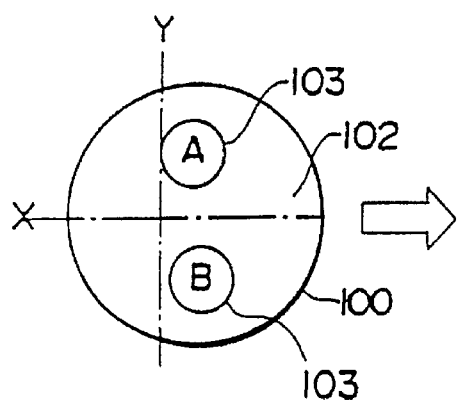
FIG. 8(C)
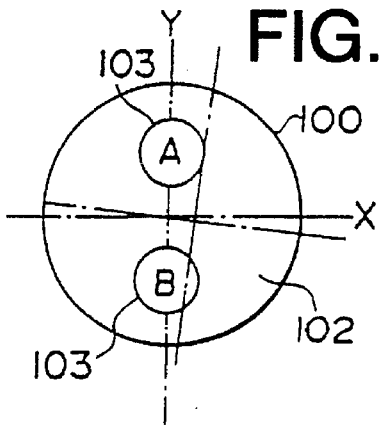
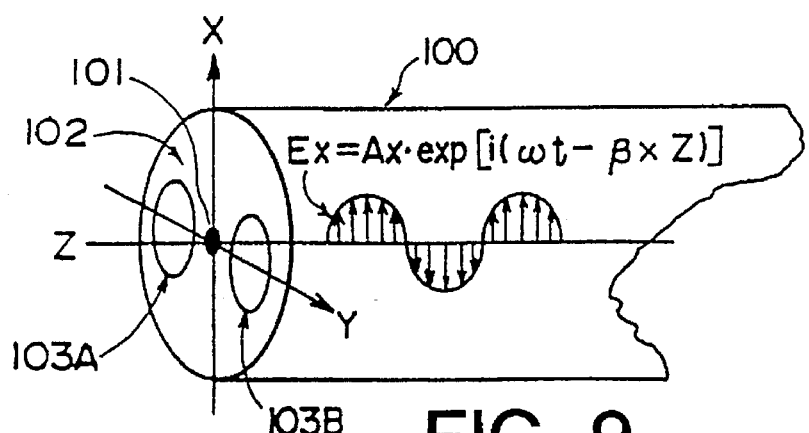
FIG. 9
PRIOR ART

OPTICAL FIBER FERRULE ASSEMBLY HAVING ANGULAR INDEX SHOWING POLARIZATION PLANE

BACKGROUND OF THE INVENTION

1. Field of the Invention

The present invention relates to a fiber assembly using a PANDA (Polarization-maintaining AND Absorbtion-reducing fiber) optical fiber, and more particularly to an optical fiber ferrule assembly equipped with an angular index indicating a polarization plane of an optical fiber.

2. Description of the Related Art

In optical instrumentations and optical communications, there has been known a polarization plane maintaining optical fiber which is capable of carrying out transmission while maintaining its polarization plane. The polarization plane maintaining optical fiber has come into widespread use in coherent communication fields which are affected by the polarization condition or in fields which input and output the characteristics of optical equipment and in other fields which depend upon the optical polarization condition.

The polarization plane maintaining optical fibers can be realized using a double refraction fiber. The polarization plane maintaining optical fiber using the double refraction fiber can structurally be classified into a type which provides a stress and the type in which the core configuration is deformed from a circle to an ellipse. Today, there has been employed a PANDA fiber (Polarization-maintaining AND Absorption-reducing fiber) which is of the stress-providing type. A brief description will be made hereinbelow of the structure of this PANDA fiber with reference to FIG. 9. In FIG. 9, in a cladding 102 of this PANDA fiber 100, there are provided stress-providing members 103A and 103B which are made of a glass having a greater coefficient of thermal expansion than that of a silica glass surrounding them. When the fiber gets cold after being drawn at a high temperature, the shrinkage of the stress-providing members is larger than that of the surrounding material, so that a core 101 is pulled in the Y direction while a compressive stress takes place in the X direction. As a result, owing to the photoelastic effects, the core 101 has different indexes of refraction in the X and Y directions, which makes a difference in a propagation constant of the propagating polarization mode. In addition, although various devices have been studied heretofore on the basis of the methods of providing stresses, today the following two fibers except the PANDA type has been put in practical use. A bow tie type having fan-shaped stress-providing members was developed in the U.K. On the other hand, a jacket (stress-providing member placed around the cladding) type was developed in Japan and has been put in practical use. Further, the types of deforming the core configuration were researched, nevertheless they have not been put in practical use.

For connections between such polarization plane maintaining optical fibers and between the polarization plane maintaining optical fiber and a different device, their polarization planes need to coincide with each other with a high degree of accuracy. For this reason, the connection relies on the individual adjustment. A pair of ferrules which support the optical fibers being coupled are inserted into a sleeve in opposed relation to each other. One of them is coupled to a light source, whereas the other is connected with an optical power meter. In this state, they are fixed when the connection loss is at a minimum. This method is realizable utilizing the structure disclosed in Japanese Unexamined Published Patent Application No. 61-228404.

However, if a precise index indicating the polarization plane for the ferrule for the polarization plane maintaining optical fibers is provided, even if the polarization plane alignment is not done individually, the connections between the ferrules, between the ferrule and the light source and between the ferrule and a device with a polarization characteristic are possible and the individual adjustment becomes unnecessary.

SUMMARY OF THE INVENTION

It is therefore an object of the present invention to provide an optical fiber ferrule assembly equipped with an angular index which is capable of indicating the polarization plane of an optical fiber for carrying out the polarization plane alignment in assembling the polarization plane maintaining optical fiber ferrule or a connector, instead of carrying out the alignment work in a connector-assembled state, an index section being provided on a single ferrule to which the optical fiber is set.

For this purpose, an optical fiber ferrule assembly with an angular index indicating a polarization plane of an optical fiber according to this invention comprises: a polarization plane maintaining optical fiber; an optical fiber ferrule for accepting the optical fiber to fixedly hold the optical fiber in a state that its tip portion is exposed; and an angular index member which is rotatable with respect to the optical fiber ferrule until it is fixed, wherein the optical fiber is fixed in the optical fiber ferrule, the angular index member and the optical fiber ferrule are temporarily assembled, a front surface of the optical fiber is enlarged for observation to decide the polarization plane on the basis of its configuration, and the optical fiber and angular index member are relatively rotated then mutually fixed so that the angular index makes a predetermined angle with respect to the polarization plane.

The aforesaid optical fiber ferrule assembly is preferably equipped with a flange body which is fixedly secured to a proximal portion of the optical fiber ferrule and which is made to accommodate a coated portion of the optical fiber, and the angular index member has a central hole which rotatably accommodates the ferrule and has an index section on its circumferential section.

In the aforesaid optical fiber ferrule assembly, the angular index member is fixedly secured to a stage of a microscope with respect to the index in a state that the optical fiber ferrule is in a rotatably supported state, and the ferrule is rotated while an enlarge image of the tip surface of the optical fiber is observed with the microscope. The index member and the ferrule are fixedly adhered when the enlarged image reaches a given relation to the index of the angular index member.

The angular index member is preferably a disc-like member having a hole which is engaged with the circumference of the ferrule, and the index is formed as a groove made in the circumference thereof. Further, the optical fiber is of a PANDA type, and circular configurations of two stress-providing members appear in an end surface of the optical fiber.

BRIEF DESCRIPTION OF THE DRAWINGS

The object and features of the present invention will become more readily apparent from the following detailed description of the preferred embodiments taken in conjunction with the accompanying drawings in which:

FIGS. 8(A)–8(C) are schematic illustrations of a field of view of a microscope and an enlarged end of an optical fiber for describing the adjusting process; and FIG. 9 is a schematic illustration for explaining the principle of a PANDA type optical fiber.

DETAILED DESCRIPTION OF PREFERRED EMBODIMENTS

Figure 1:
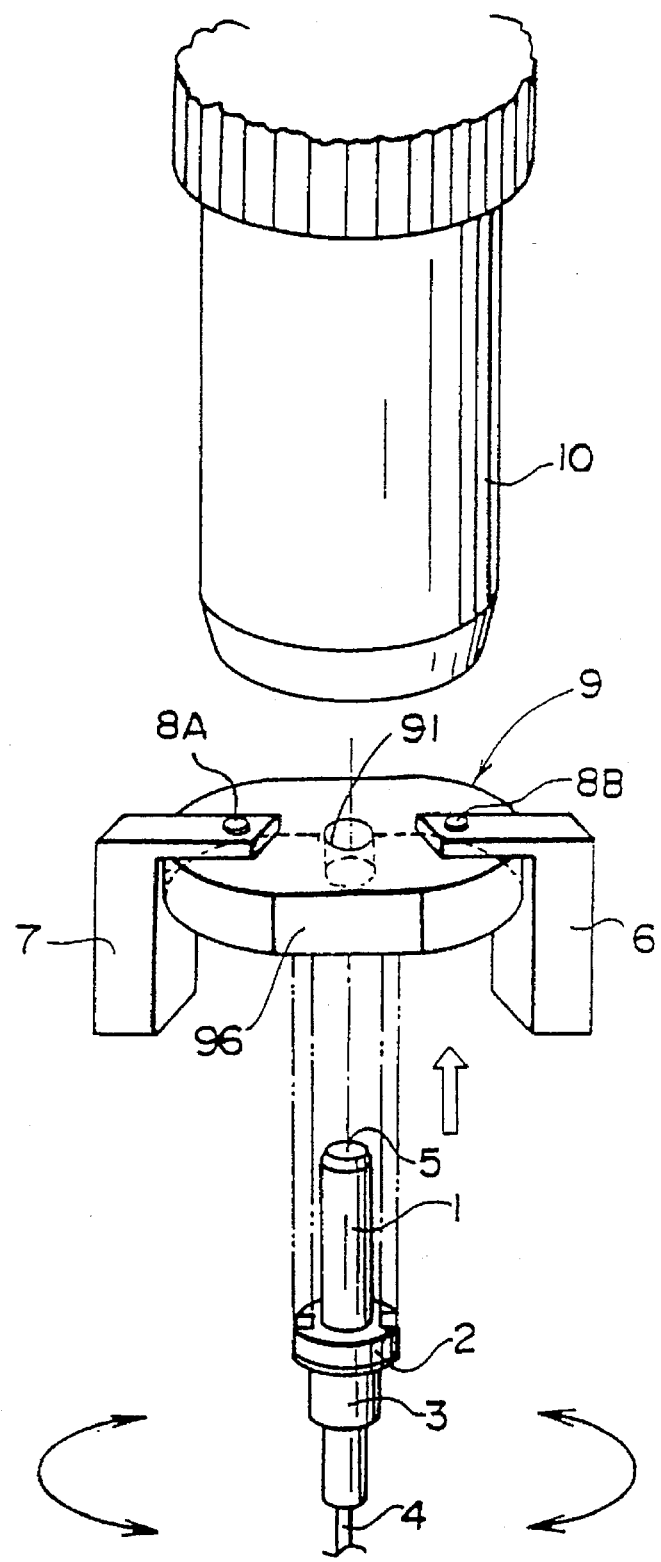
FIG. 1 is a development and perspective view available for describing the adjustment of an optical fiber ferrule assembly equipped with an angular index which indicates the polarization plane of an optical fiber according to this invention.
Figure 2:
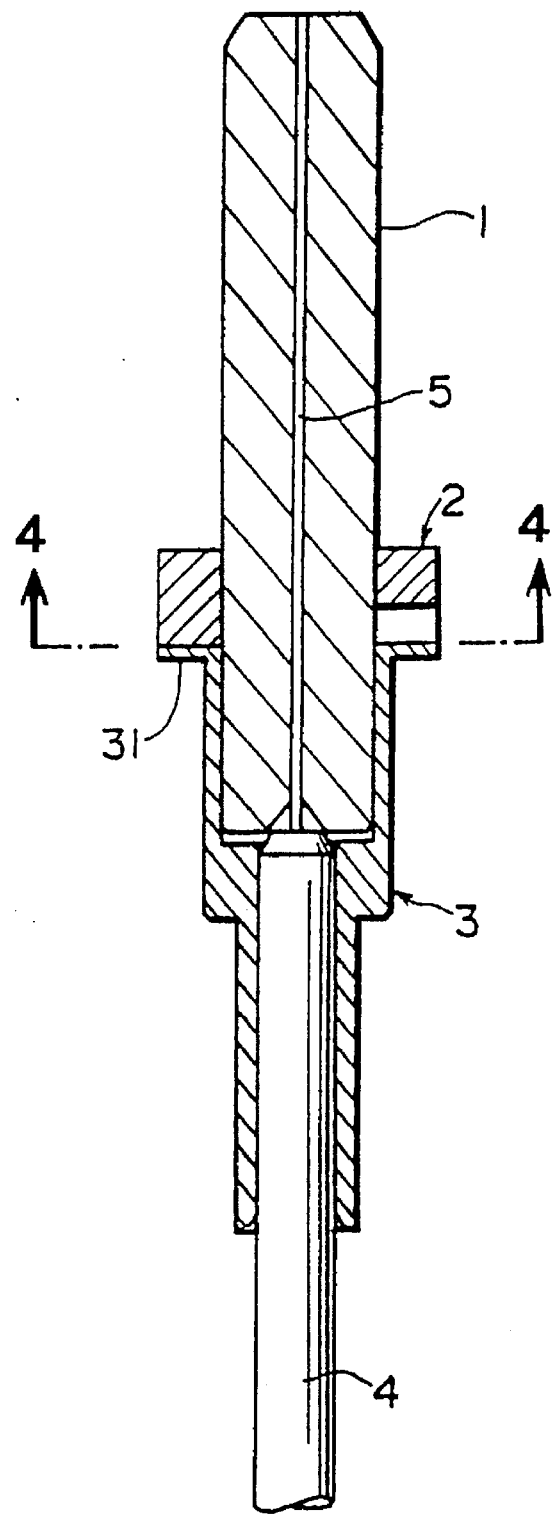
FIG. 2 is a cross-sectional view showing an optical fiber ferrule assembly provided with an angular index for indicating the polarization plane of an optical fiber according to an embodiment of this invention.

Referring now to the drawings, a more detailed description will be made hereinbelow of an optical fiber ferrule assembly having an angular index which indicates the polarization plane of an optical fiber according to the present invention. FIG. 1 is a development and perspective view available for describing the adjustment of an optical fiber ferrule assembly equipped with an angular index which indicates the polarization plane of an optical fiber according to this invention, and FIG. 2 is a cross-sectional view showing an embodiment of the optical fiber ferrule assembly. In the illustrations, the coating of a polarization plane maintaining optical fiber is removed and an uncovered optical fibers 5 of the optical fiber is then inserted into an optical fiber ferrule 1 and glued and fixed thereto. At this time, the tip portion of the optical fiber 5 is positioned in the same plane as the end surface of the ferrule 1 or slightly protruding therefrom, and the optical fiber surface is kept to be optically smooth without cuts. In this case, there is no need for the angular position of the optical fiber 5 relative to the ferrule 1 to be considered. In a state that a coated portion 4 of the optical fiber has been inserted into a flange body 3 with a brim 31 and fixed therein, the optical fiber 5 is inserted into a central hole of the ferrule 1 and fixed therein, and further the flange body 3 is fixed through an adhesive material to the proximal portion of the ferrule 1.

Figure 3:
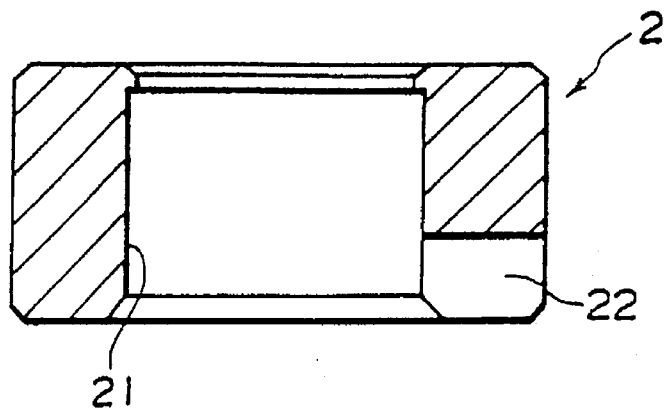
FIG. 3 is a cross-sectional view showing an angular index member according to the embodiment of this invention.
Figure 4:
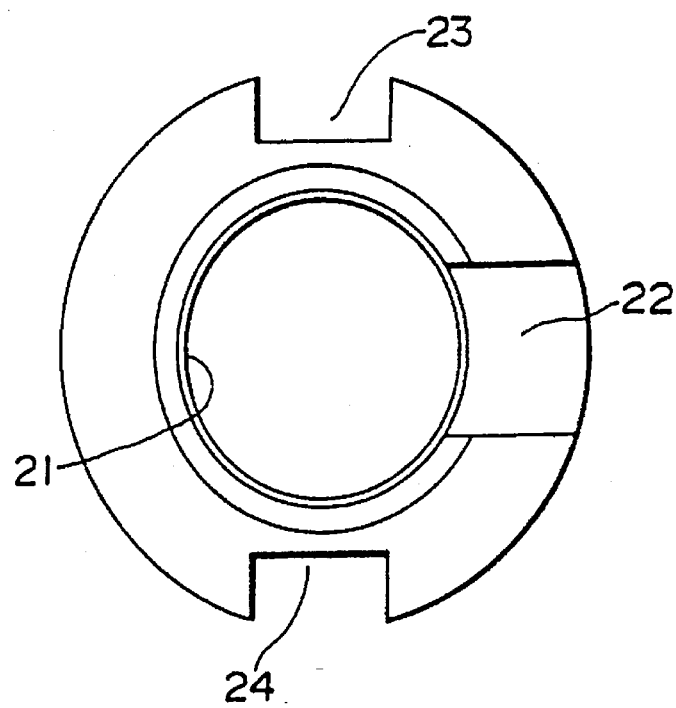
FIG. 4 is a bottom view, taken along line 4—4 of FIG. 2, showing the angular index member according to the embodiment of this invention.

FIG. 3 is a cross-sectional view showing an angular index member 2 according to an embodiment of this invention, and FIG. 4 is a bottom view of the same angular index member. In the illustrations, the angular index member 2 has a central hole 21 which is engaged with the outer circumference of the aforesaid ferrule 1 so that the angular index member 2 is rotatable about the axis of the ferrule 1. The angular index member 2 has index grooves 23, 24 in its outer circumference and further has at its bottom side a cavity 22 by which the angular index member 2 is fixedly secured to the flange body 3. The angular index member 2 is temporarily fitted over the ferrule 1 to form a temporary assembly by means of friction.

Figure 5:
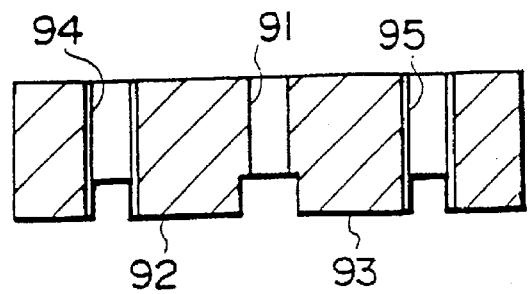
FIG. 5 is a cross-sectional view showing a jig (device) to be used in the process for assembling an optical fiber ferrule assembly equipped with an angular index member for indicating the polarization plane of an optical fiber according to this invention.
Figure 6:
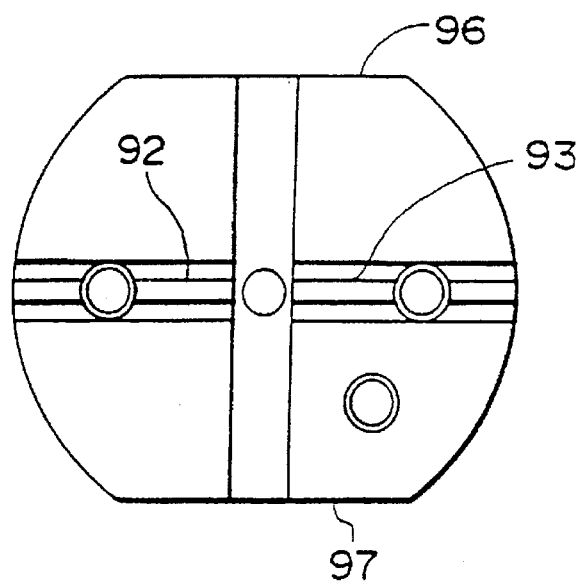
FIG. 6 is a bottom view showing the jig.
Figure 7:
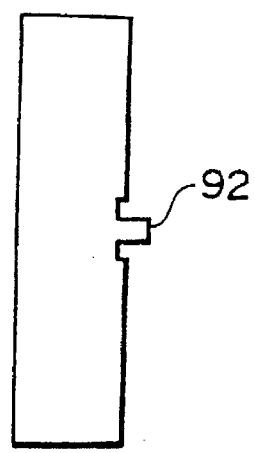
FIG. 7 is a side elevational view showing the jig.

As shown in FIG. 1, a jig 9 is fixed to arms 6, 7 of the stage side of a microscope with an objective 10. This jig 9 is two-dimensionally relatively movable and rotatable with respect to the objective 10 of the microscope, and as will be described later, can support the optical fiber ferrule 1 and set the center of the end surface of the optical fiber to the focus of the optical axis of the objective 10. The jig 9 is illustrated in detail in FIGS. 5 to 7. FIG. 5 is a cross-sectional view showing the jig 9, which is, used in a process for assembling the optical fiber ferrule assembly equipped with an angular index member for indicating the polarization plane of an optical fiber according to this invention, FIG. 6 is a bottom view showing the jig 9, and FIG. 7 is a side elevational view showing the jig 9. The jig 9 has tapped holes 94, 95 (see FIG. 5) and, as shown in FIG. 1, is fixed through screws 8A, 8B to the arms 6, 7 of the stage side of the microscope, and the center of the jig 9 accepts the ferrule 1 in the temporarily assembled state. Further, the jig 9 has projections 92, 93 on its bottom surface and the width of the projections 92, 93 corresponds to the width of the index grooves 23, 24 in the outer circumference of the angular index member 2 of the temporarily assembled ferrule. The projections 92, 93 are fitted into the grooves 23, 24 to support the angular index member 2 by means of friction and further to limit its rotation.

FIG. 8 illustrats examples of the field of view of a microscope. Under the field of view of the microscope, the stage is rotationally moved so that a reference surface 96 or 97 of the jig 9 is coincident with the X-axis of the crossing axes (lines) as shown in FIG. 8(A). The stage is shifted from this state for the adjustment so that the center of an optical fiber 100 at the central portion of the jig 9 approaches the origin (crossing point) of the crossing axes. FIG. 8(B) shows the state that the center of the optical fiber 100 has substantially got close to the crossing point of the crossing axes. In this embodiment, the magnification of the microscope is set to 500. When the tip portion of the optical fiber 100 is enlarged and adequately illuminated, stress providing members 103A, 103B in a cladding 102 of the optical fiber 100 are different in optical characteristic from the cladding 102 and hence their profiles appear therein. Referring to these profiles, the stage of the microscope is moved and the aforesaid temporarily assembled ferrule is rotated, whereby the adjustment is implemented so that the line connecting one stress providing member 103A to the other member 103B becomes parallel to the Y-axis of the crossing axes. When they come into alignment, an instantaneous adhesive material is injected between the flange body 3 and angular index member 2, i.e., onto the fixing section 22, by means of an injector or the like so that the angular index member 2 is fixedly secured to the flange body 3. Thereafter, if required, the end surface is polished with respect to the grooves 23, 24 of the flange A. Using the ferrule assembly thus produced can make an SC type connector or an FC type connector. The assembling procedure is taken with respect to the grooves 23, 24 as well as a prior assembly.

According to this invention, since the optical fiber ferrule assembly is provided with an index such as grooves indicating the polarization plane, even in the case of SC type connector which does not permit rotational alignment by screws after assembly, alignment is possible with the ferrule itself and an adjustment is unnecessary. If the tip portion of the optical fiber is ground so that it is inclined to reduce the reflection return loss, the direction of inclination and the polarization plane must have a given relation to each other. In such a case, the inclination grinding of the optical fiber can easily done with respect to the index of the ferrule assembly.

The above-described embodiment can be modified in various ways within the scope of this invention. Although in the above embodiment a microscope is used in the assembling process of the ferrule and the worker makes the adjustment while observing the image of the end surface of the optical fiber, it is also appropriate that, in a state that the ferrule is fixed, the image of the optical fiber end surface by the microscope is formed on a CCD and processed to specify the angle of the central line for the connection between the two stress providing members so that the stage is automatically rotationally moved on the basis of the positional information to automatically create the state as shown in FIG. 8(C). Further, although the index is formed as grooves, projections, marking, stripes or others are also possible if they are usable as a reference.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An optical fiber ferrule assembly comprising:

a polarization plane maintaining optical fiber;

an optical fiber ferrule for accepting said optical fiber to fixedly hold said optical fiber in a state that its tip portion is exposed;

an angular index member which is rotatable with respect to said ferrule until said angular index member is fixed at a predetermined angle with respect to a polarization plane of said optical fiber, said angular index member having a central hole which rotatably accommodates said ferrule and having a circumferential section with an index section to indicate said polarization plane of said optical fiber; and a flange body which is fixedly secured to a portion of said ferrule and which accommodates a coated portion of said optical fiber, wherein said optical fiber is fixed to said optical fiber ferrule, said angular index member and said optical fiber ferrule are temporarily assembled, said angular index member is temporarily secured to a stage of a microscope in a state such that said ferrule is in a rotatably supported state, said ferrule is rotated while an enlarged image of a tip end surface of said optical fiber is observed with said microscope, and said angular index member and said ferrule are fixedly adhered when the enlarged image reaches a given relation to said index section of said angular index member, so that said angular index makes said predetermined angle with respect to the polarization plane and indicates said polarization plane of said optical fiber.

2. An optical fiber ferrule assembly as defined in claim 1, wherein said angular index member is a disc-like member, and said index section comprises a groove made in a circumference of said angular index member.

3. An optical fiber ferrule assembly as defined in claim 1, wherein said optical fiber is of a PANDA type, and circular configurations of two stress-providing members appear in said tip end surface of said optical fiber.

4. An optical fiber ferrule assembly comprising:

a polarization plane maintaining optical fiber having stress providing members embedded therein;

a ferrule; and an angular index member having a central hole, wherein said optical fiber ferrule assembly is made by a process which includes the steps of fixing the optical fiber to the ferrule so that a tip end portion of the fiber is exposed;

inserting the ferrule into the central hole of the angular index member to form a temporary assembly;

supporting the temporary assembly on a stage of a microscope;

rotating the ferrule with respect to the angular index member, while observing the tip end portion of the fiber through the microscope, until a predetermined relationship between the stress providing members and a coordinate system is observed through the microscope; and fixing the angular index member with respect to the ferrule.

* * * * *

UNITED STATES PATENT AND TRADEMARK OFFICE
CERTIFICATE OF CORRECTION

PATENT NO.:    5,668,905
DATED    :    September 16, 1997
INVENTOR(S):    Mitsuo Takahashi et al It is certified that an error appears in the above-identified patent and that said Letters Patent is hereby corrected as shown below:

In the heading of the patent, under [30], the Japanese priority application should be --7-262378--.

Signed and Sealed this

Ninth Day of December, 1997

Attest:

BRUCE LEHMAN

Attesting Officer        Commissioner of Patents and Trademarks